(12) United States Patent
Volzke

(10) Patent No.: US 10,080,112 B2
(45) Date of Patent: Sep. 18, 2018

(54) UNWANTED CALLER AND MESSAGE SENDER IDENTIFICATION FOR RESTRICTED COMMUNICATION DEVICES

(71) Applicant: Hiya, Inc., Seattle, WA (US)

(72) Inventor: Jan Volzke, Sausalito, CA (US)

(73) Assignee: HIYA, INC., Seattle, CA (US)

( * ) Notice: Subject to any disclaimer, the term of this patent is extended or adjusted under 35 U.S.C. 154(b) by 0 days.

(21) Appl. No.: 14/277,806

(22) Filed: May 15, 2014

(65) Prior Publication Data

US 2015/0334230 A1    Nov. 19, 2015
US 2018/0183927 A9    Jun. 28, 2018

Related U.S. Application Data

(60) Provisional application No. 61/822,726, filed on May 13, 2013.

(51) Int. Cl.

| H04M 3/42 | (2006.01) |
|---|---|
| H04W 4/16 | (2009.01) |
| H04M 3/436 | (2006.01) |
| H04L 12/58 | (2006.01) |
| H04W 4/02 | (2018.01) |

(52) U.S. Cl.
CPC ............ H04W 4/16 (2013.01); H04L 51/12 (2013.01); H04M 3/42059 (2013.01); H04M 3/436 (2013.01); H04W 4/02 (2013.01)

(58) Field of Classification Search
CPC ......... H04W 4/02; H04W 4/16; H04M 3/436; H04M 3/40259; H04L 51/12

USPC ...... 455/412.2, 415, 414.1, 419; 379/142.17, 379/88.25, 88.02, 210.02, 201.01

See application file for complete search history.

(56) References Cited

U.S. PATENT DOCUMENTS

| 6,253,075 | B1 | 6/2001 | Beghtol et al. |
| 7,620,160 | B2 * | 11/2009 | Tidwell et al. ............ 379/88.25 |
| 8,605,879 | B2 * | 12/2013 | Wellard ............ H04M 3/42374 |
| | | | 379/201.01 |
| 9,100,476 | B1 | 8/2015 | Devitt et al. |
| 9,106,739 | B1 | 8/2015 | Devitt et al. |
| 2004/0224675 | A1 * | 11/2004 | Puskoor et al. ............. 455/419 |
| 2007/0064920 | A1 | 3/2007 | Ruckart |

(Continued)

OTHER PUBLICATIONS

"Avoid Spam Calls with Truecaller," Trueman, True Software Scandinavia AB, Jun. 2, 2010, 4 pages.

(Continued)

*Primary Examiner* — Wayne Cai
(74) *Attorney, Agent, or Firm* — Fenwick & West LLP

(57) ABSTRACT

Method for enabling unwanted caller notifications or unwanted message sender notifications for all communication devices and applications including those with restricted programmatic call and message log access. The method delivers and stores a database of unwanted caller/message sender identification information in the device default contacts list, which is made available to the device's default caller/message sender identification service and to applications installed on the device. In one embodiment the unwanted caller/message sender identification information database is delivered as a separate synchronized address book, which can include additional unwanted caller notification information, for example the number or type of complaints about a given phone number.

20 Claims, 3 Drawing Sheets

(56) References Cited

U.S. PATENT DOCUMENTS

| | | |
|---|---|---|
| 2007/0201650 A1 | 8/2007 | Mastro |
| 2009/0136013 A1* | 5/2009 | Kuykendall .......... H04M 1/575 |
| | | 379/142.17 |
| 2009/0157732 A1 | 6/2009 | Hao et al. |
| 2009/0298489 A1 | 12/2009 | Chitturi et al. |
| 2010/0056117 A1 | 3/2010 | Wolfman et al. |
| 2010/0074420 A1* | 3/2010 | Bauchot .............. H04M 1/6505 |
| | | 379/88.02 |
| 2010/0198854 A1 | 8/2010 | Chitturi et al. |
| 2010/0203874 A1 | 8/2010 | Scott et al. |
| 2011/0014900 A1 | 1/2011 | Gottfried |
| 2012/0276877 A1* | 11/2012 | Balannik et al. .......... 455/412.2 |
| 2013/0170635 A1* | 7/2013 | Kirkpatrick ........... H04M 3/436 |
| | | 379/210.02 |
| 2014/0128047 A1* | 5/2014 | Edwards et al. ............. 455/415 |
| 2014/0199975 A1* | 7/2014 | Lou et al. .................. 455/414.1 |

OTHER PUBLICATIONS

"Truecaller 2.0 for Android is Finally Released! Woohoo!," Trueman, True Software Scandinavia AB, Oct. 19, 2010, 4 pages.

\* cited by examiner

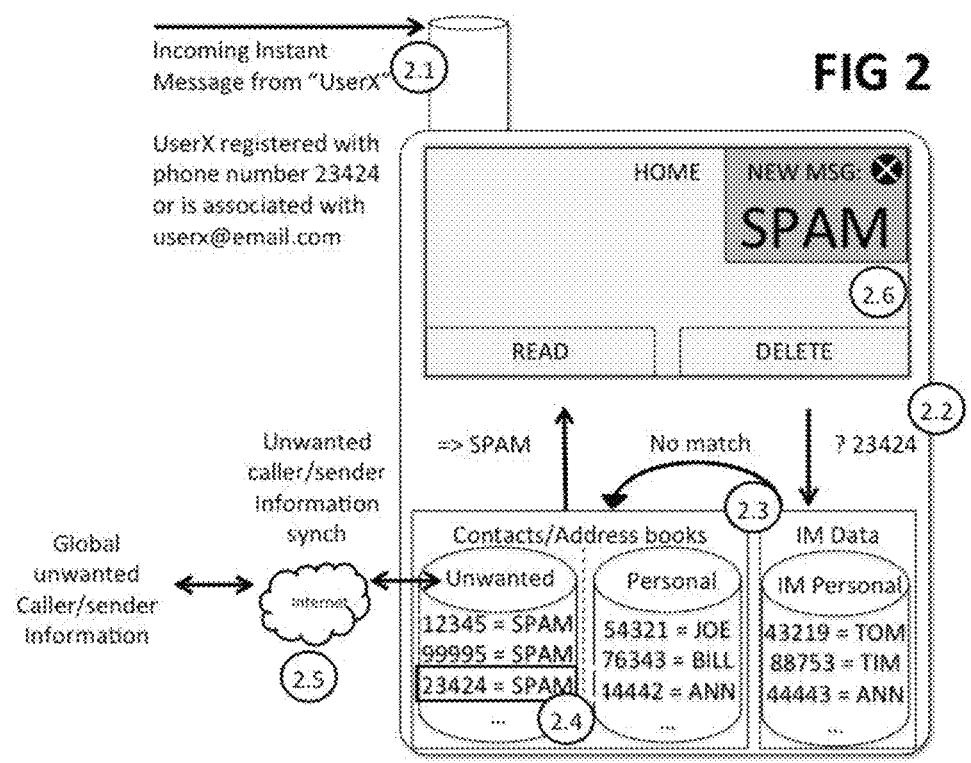

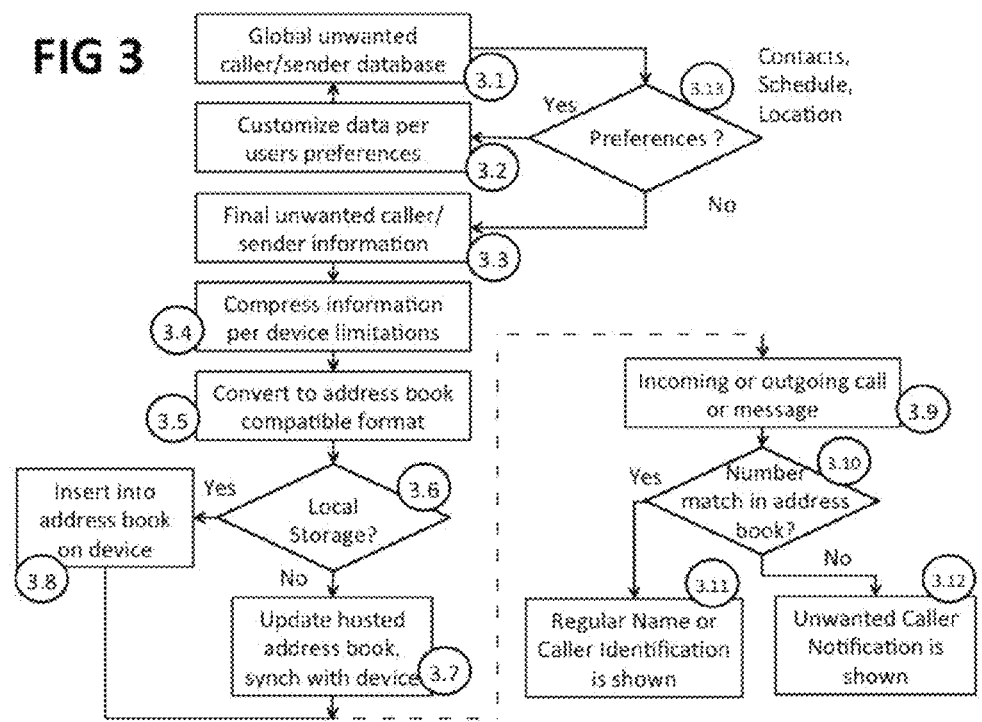

UNWANTED CALLER AND MESSAGE SENDER IDENTIFICATION FOR RESTRICTED COMMUNICATION DEVICES

CROSS-REFERENCE TO RELATED APPLICATIONS

This application claims the benefit of U.S. Provisional Application No. 61/822,726 filed May 13, 2013.

BACKGROUND

The present invention is related to the field of caller identification and identification of message senders; commonly described as "caller ID services" in this document. More specifically, the present invention pertains to a method that enables the identification of unwanted callers or message senders with restricted communication devices or applications.

For the purpose of this document, an "unwanted" caller or message sender shall be defined as a personal or commercial contact, that a user wants to avoid or prefers to have no interaction with, via a incoming or outgoing phone call or messaging for reasons of personal preference or privacy.

For the purpose of this document, a "restricted communication device or application" is a device or application, which do not expose APIs (Application Program Interface) for programmatically accessing its call and message stack, either in real time (as calls or messages arrive or as calls are dialed or messages are sent), or by accessing the call or message history/log. Additional restrictions are imposed where a communications device limits the user to the device's default caller ID service at time of a call or message event. At the time of writing one example of such a "restricted device" is Apple's iPhone. One example of such a "restricted application" commonly described as "Instant Messaging application" or "IM application", is WhatsApp for iOS.

The majority of related art in the field services relies on communication devices' or applications' ability to expose details of an incoming call or message for providing additional caller ID and caller information services, however such methods fail in restricted environments as described in the immediately preceding paragraph.

Further shortcomings of related art is caused by dependencies on the communication device or application's ability to replace or multitask the default caller ID service with its own user interface, again such methods fail in restricted environments as described above.

Other related art for providing caller ID identifications requires network components such as switches, routers or other additional devices to which calls and messages are diverted prior or in parallel to being delivered to the designated receivers. Such methods fail where accessing additional components are technically inaccessible.

Instead this present invention utilizes the comminations devices' default caller ID service. Caller ID service rely on a phone number being transmitted together with each call or message. If the transmitted number matches a record in the device contacts list (frequently referred to as address book), the device's default caller ID service replaces the number with the name of the contact. This allows a user to recognize contacts without remembering their individual phone numbers. However, if no match for a transmitted phone number can be found in the user's contact list, no name can be shown and the actual transmitted number is shown instead. At this point the user may a) answer the call or message to find what it is about or b) ignore the call or message and possibly research the number manually.

While researching the number, users frequently find that there are numbers, especially from the 800-service area code, which are used by telemarketers, robo calls, or in some cases, identity thieves and phone scam artist. Given the information about unwanted callers is available, this present invention comprises a method of providing this information to the user's device, so that unwanted callers and message senders can be recognized automatically and notified timely as such to the user (for example "Spam"), including but not limited to cases where the user has not stored them previously in their address book and the device or application has call and message log restrictions.

BRIEF SUMMARY OF THE INVENTION

The following is intended to be a brief summary of the invention and is not intended to limit the scope of the invention.

A method of enabling incoming and outgoing unwanted caller notifications and incoming and outgoing unwanted message sender notification, by storing and updating a database of unwanted caller and unwanted message sender information in the memory of a communication device, which is shared by the device's default caller ID service.

The method of above for communication devices and applications where call and message events and logs cannot be accessed programmatically or where it's default caller ID service cannot be replaced.

The method of above, wherein the database of unwanted caller and unwanted message sender information is stored and updated as a separate, synchronized address book or similar groups of contacts on the communication device.

The method of above, wherein the database of unwanted caller and unwanted message sender information utilizes phone numbers, email-addresses or social network user names as unique contact identifiers.

The method of above, wherein the database of unwanted caller and unwanted message sender information is continuously adjusted as per the communication device user's contact, schedule or location preferences.

BRIEF DESCRIPTION OF THE DRAWINGS

FIG. 2 depicts how the method of unwanted message sender notification is generated by a third party IM application FIG. 3 depicts a flow diagram representing the creation and delivery of personalized unwanted caller and message sender information database to a communication device

DETAILED DESCRIPTION AND BEST MODE OF IMPLEMENTATION

Figure 1:
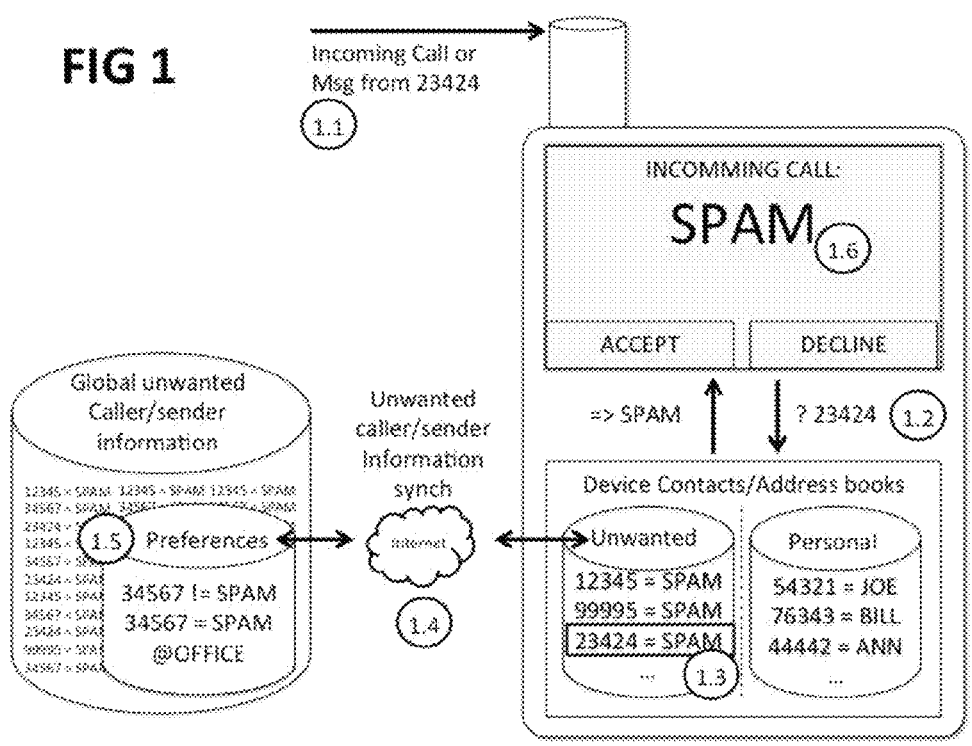
FIG. 1 depicts how the method of unwanted caller notification is generated by a communication device's default caller ID service

FIG. 1-3 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

FIG. 1 depicts an exemplary embodiment of the method of an unwanted caller notification, generated by a communication device's default caller ID service. Assume that a communication device receives an incoming call from an exemplary phone number 23424 (1.1). The communication device's default caller ID service queries all address books and contact lists present on the device for relevant information about the calling number, such as a name, company information etc. (1.2). If a match is found the mobile device's default caller ID service propagates this information across the device including the device's display (1.6) and the device's call logs. In this exemplary embodiment the unwanted caller notification service is enabled by providing an additional address book, separated from the user's personal address book, which contains unwanted caller identification information (1.3). FIG. 1 shows that a default caller ID service query for number 23424 across all address books (1.2) results with a match in the method's unwanted caller information address book (1.3), and the responding caller name, for example "SPAM", is propagated through out the device enabling a "SPAM" notification for this incoming call (1.6).

FIG. 2 depicts an exemplary embodiment of the method of an unwanted message sender notification, generated by a third party IM application. Assume that an application installed on a communication device receives an incoming instant message from an exemplary user: UserX. The IM application did not previously exchange messages with UserX and has no context about this user stored within the IM application. Further assume that the IM applications account management system knows that UserX registered with the IM service using the phone number 23424 or other unique identifiers like an email address userx@email.com (2.1). The IM application queries available internal application data and all address books and contact lists present on the device for relevant information such as a real name, nick name etc. (2.2) and other account information of UserX (in this example, phone number 23424). If a compliant match is found the IM application notifies the user about this information on the device's home screen (2.6). In this exemplary embodiment the unwanted message sender notification service is enabled by providing an additional address book, separated from the user's personal address book, which contains unwanted message sender identification information (2.4). FIG. 2 shows that performing an identification query for number 23424 across the IM applications internal data (2.2, "IM Data") yields no compliant result (2.3), because the IM application did not previously exchange messages with UserX. However there is a match in the method's unwanted sender information address book (2.4), and the sender name, for example "SPAM", is used for the IM application's New Message notification (2.6).

Both FIG. 1 and FIG. 2 illustrate that the unwanted caller/message sender address book can be a synchronized copy of an Internet hosted address book (1.4 and 1.5, 2.5). The Internet hosted address book serves as the master address book of unwanted caller and message sender information and is frequently updated by customizing global database information with personal preferences of the user (1.5). FIG. 3 represents the method's creation and delivery of a personalized unwanted caller/message sender information address book to a communication device in more detail.

Another similar embodiment of the method for enabling unwanted caller/message sender notifications uses alternative parameters such as email addresses or social network account ID's as unique identifiers for its unwanted contact information database. Independently of the identifier being used, the method enables unwanted caller and message sender notifications by providing additional context from an unwanted caller/message sender information address book stored on the device.

FIG. 3 depicts a flow diagram representing the creation and delivery of personalized unwanted caller and message sender information to a mobile device and therefore enabling unwanted caller and message sender notifications. Given a global unwanted caller/message sender database (3.1) the method customizes the global dataset according to the method's user preferences, not limited to but including the user's location preference, availability ("schedule") preference and contact preference (3.2.) as well as considering additional individual user and account parameter such as subscription/service plan information. In a following step the final personalized unwanted caller and message sender information (3.3) is compressed and structured to fit the characteristics of the communication device, in particular the device's memory limitations (3.5).

Continuing with FIG. 3 (3.6), the method now evaluates available options of delivering the unwanted caller and message sender information to the device. In one exemplary embodiment the method installs and updates an Internet hosted address book and initiates the device to remotely synchronize the address book information as a background task (3.7). In another embodiment the method stores the information directly in the users default address book, considering additional device limitations such as memory limitations and potential conflicts caused by installed address book synchronization services. (3.6). Any subsequent incoming or outgoing call or message sender information is screened by the communication device's default caller ID service using the latest set of unwanted caller and message sender information (3.7).

Continuing with FIG. 3 (3.13), the method performs frequent checks for a change in the device location, contacts being added or removed by the device users, and monitors the current time for a match with the users unwanted caller and message sender notification preferences. If a preference matches the method restarts customizing the global dataset of unwanted caller and message sender information according to a method's user preferences (3.2) and continues with the method's process of delivering this information to the device as shown in FIG. 3.

What is claimed is:

1. A method of enabling incoming unwanted caller notifications and incoming unwanted message sender notifications for a restricted communication device, the method comprising:
    sending a user's personal preference to a server;
    receiving, from the server, a database of unwanted caller and unwanted message sender information customized based on the user's personal preference;
    storing, by an application program executing on the restricted communication device, the received database of unwanted caller and unwanted message sender information as a separate address book in a memory of the restricted communication device, the restricted communications device being a device that has application programming interfaces (APIs) that restrict the application program from programmatic access to the call and message stack of the restricted communication device; and displaying identification information for incoming calls and incoming instant messages, the identification information retrieved from the stored database of unwanted caller and unwanted message sender information by using a default caller identification (ID) service to query the separate address book stored in the memory of the restricted communication device, the default caller ID service being an unreplaceable default component of the restricted communication device that is different from the application program.

2. The method of claim 1, wherein the database of unwanted caller and unwanted message sender information uses social network user names as unwanted contact identifiers.

3. The method of claim 1, wherein the database of unwanted caller and unwanted message sender information is adjusted as per schedule preferences of a user.

4. The method of claim 1, wherein the identification information indicates an unwanted call indicator for an incoming number.

5. A computer-implemented method of enabling incoming unwanted caller notifications and incoming unwanted message sender notifications for restricted communication devices, the method comprising:
    receiving, from an application program executing on a restricted communication device, a personal preference of a user of the restricted communication device, the received personal preference of the user used to determine one or more incoming callers and message senders that the user of the restricted communication device wants to avoid, the restricted communications device being a device that has application programming interfaces (APIs) that restrict the application program from programmatic access to the call and message stack of the restricted communication device;
    customizing a personalized unwanted caller and message sender list for the restricted communication device from a global unwanted caller and message sender database based on the received personal preference of the user and individual user and account parameters for the user;
    structuring the customized personalized unwanted caller and message sender list to fit characteristics of the restricted communication device; and
    delivering the customized personalized unwanted caller and message sender list to the restricted communication device, wherein the restricted communication device displays identification information for incoming instant messages and incoming calls using a default caller identification (ID) service, the identification information retrieved from the delivered customized personalized unwanted caller and message sender list, and the default caller ID service being an unreplaceable default component of the restricted communication device that is different from the application program.

6. The method of claim 5, wherein the personal preference of the user is based on a location of the restricted communication device.

7. The method of claim 5, wherein the personal preference of the user is based on schedule information stored in the restricted communication device.

8. The method of claim 5, wherein the personal preference of the user is based on contact information stored in the restricted communication device.

9. The method of claim 5, further comprising:
    determining that a condition of the restricted communication device matches a second personal preference of the user;
    updating the customized personalized unwanted caller and message sender list for the restricted communication device from the global unwanted caller and message sender database based on the matched user preference; and
    delivering the updated customized personalized unwanted caller and message sender list to the restricted communication device.

10. The method of claim 5, further comprising:
    creating an Internet-hosted master copy of the customized personalized unwanted caller and message sender list;
    updating the Internet-hosted master copy of the personalized unwanted caller and message sender list based on an update to the personal preference of the user; and
    synchronizing the Internet-hosted master copy of the customized personalized unwanted caller and message sender list to the delivered customized personalized unwanted caller and message sender list on the restricted communication device.

11. The method of claim 5, wherein the characteristics of the restricted communication device include a memory limitation of the restricted communication device.

12. The method of claim 5, wherein the customized personalized unwanted caller and message sender list includes identification information for incoming instant messages and incoming calls, the identification information indicating an unwanted call indicator for an incoming number.

13. The method of claim 5, wherein the delivered customized personalized unwanted caller and message sender list is continuously updated based on the personal preference of the user.

14. A computer system for enabling incoming unwanted caller notifications and incoming unwanted message sender notifications for restricted communication devices, comprising:
    a computer processor for executing computer program instructions; and
    a non-transitory computer-readable storage medium storing computer program instructions executable by the processor to perform steps comprising:
        receiving, from an application program executing on a restricted communication device, a personal preference of a user of a restricted communication device, the received personal preference of the user used to determine one or more incoming callers and message senders that the user of the restricted communication device wants to avoid, the restricted communications device being a device that has application programming interfaces (APIs) that restrict the application program from programmatic access to the call and message stack of the restricted communication device;
        customizing a personalized unwanted caller and message sender list for the restricted communication device from a global unwanted caller and message sender database based on the received personal preference of the user and individual user and account parameters for the user;
        structuring the customized personalized unwanted caller and message sender list to fit characteristics of the restricted communication device; and
        delivering the customized personalized unwanted caller and message sender list to the restricted communication device, wherein the restricted communication device displays identification information for incoming instant messages and incoming calls using a default caller identification (ID) service, the identification information retrieved from the delivered customized personalized unwanted caller and message sender list, and the default caller ID service being an unreplaceable default component of the restricted communication device that is different from the application program.

15. The system of claim 14, wherein the personal preference of the user is based on a location of the restricted communication device.

16. The system of claim 14, wherein the personal preference of the user is based on schedule information stored in the restricted communication device.

17. The system of claim 14, wherein the personal preference of the user is based on contact information stored in the restricted communication device.

18. The system of claim 14, the non-transitory computer-readable storage medium further storing computer program instructions executable by the processor to perform steps comprising:

determining that a condition of the restricted communication device matches a second personal preference of the user;

updating the customized personalized unwanted caller and message sender list for the restricted communication device from the global unwanted caller and message sender database based on the matched user preference; and delivering the updated customized personalized unwanted caller and message sender list to the restricted communication device.

19. The system of claim 14, the non-transitory computer-readable storage medium further storing computer program instructions executable by the processor to perform steps comprising:

creating an Internet-hosted master copy of the customized personalized unwanted caller and message sender list;

updating the Internet-hosted master copy of the customized personalized unwanted caller and message sender list based on an update to the personal preference of the user; and synchronizing the Internet-hosted master copy of the customized personalized unwanted caller and message sender list to the delivered customized personalized unwanted caller and message sender list on the restricted communication device.

20. The system of claim 14, wherein the characteristics of the restricted communication device include a memory limitation of the restricted communication device.

* * * * *

UNITED STATES PATENT AND TRADEMARK OFFICE
CERTIFICATE OF CORRECTION

Page 1 of 1

PATENT NO. : 10,080,112 B2
APPLICATION NO. : 14/277806
DATED : September 18, 2018
INVENTOR(S) : Jan Volzke It is certified that error appears in the above-identified patent and that said Letters Patent is hereby corrected as shown below:

In the Claims

Column 4, Line 65&66, Claim 1: "the call and message stack" to read as – a call and message stack –

Column 5, Line 18, Claim 3: "a user" to read as – the user –

Column 5, Line 36, Claim 5: "the call and message stack" to read as – a call and message stack –

Column 6, Line 54&55, Claim 14: "the call and message stack" to read as – a call and message stack –

Signed and Sealed this
Twenty-fifth Day of June, 2019

Andrei Iancu
*Director of the United States Patent and Trademark Office*